United States Patent [19]

Kubota et al.

[11] Patent Number: 4,925,909

[45] Date of Patent: May 15, 1990

[54] GAS-GENERATING AGENT FOR USE IN DUCTED ROCKET ENGINE

[75] Inventors: Naminosuke Kubota, Yokohama; Haruaki Shimizu; Tadashi Sonobe, both of Aichi; Goro Nakashita, Mitaka, all of Japan

[73] Assignees: Japan as represented by Director General, Technical Research and Development Institute, Japan Defense Agency; Nippon Oil & Fats Co., Ltd., both of Tokyo, Japan

[21] Appl. No.: 418,558

[22] Filed: Oct. 10, 1989

[30] Foreign Application Priority Data

Oct. 26, 1988 [JP]  Japan ................................. 63-268132
May 30, 1989 [JP]  Japan ................................. 1-134561

[51] Int. Cl.$^5$ .............................................. C08G 18/38
[52] U.S. Cl. ........................................ 528/55; 60/207; 149/19.4; 149/19.6; 252/183.11; 528/58; 528/77; 528/78; 552/11
[58] Field of Search ................... 252/183.11; 149/19.4, 149/19.6; 60/207; 552/11; 528/77, 78, 55, 58

[56] References Cited

U.S. PATENT DOCUMENTS

| | | | |
|---|---|---|---|
| 4,332,631 | 6/1982 | Herty et al. | 60/207 |
| 4,358,327 | 11/1982 | Reed et al. | 149/19.4 |
| 4,379,903 | 4/1983 | Reed et al. | 528/55 |
| 4,392,895 | 7/1983 | Reed et al. | 60/207 |
| 4,393,199 | 7/1983 | Manser | 528/408 |
| 4,483,978 | 11/1984 | Manser | 528/408 |
| 4,601,344 | 7/1986 | Reed et al. | 149/19.6 |
| 4,707,199 | 11/1987 | Sayles | 149/19.2 |
| 4,758,603 | 7/1988 | Carswell | 252/182.17 |
| 4,799,980 | 1/1989 | Reed | 528/77 |

*Primary Examiner*—Edward A. Miller
*Attorney, Agent, or Firm*—Oblon, Spivak, McClelland, Maier & Neustadt

[57] ABSTRACT

A gas-generating agent for use in a ducted rocket engine essentially consists of an aliphatic polyester represented by the formula:

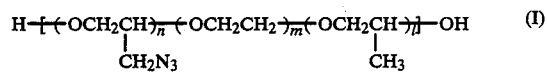

or the formula:

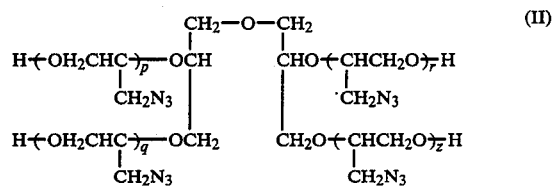

and a curing agent and optionally incorporating therein additives such as a curing catalyst.

7 Claims, 1 Drawing Sheet

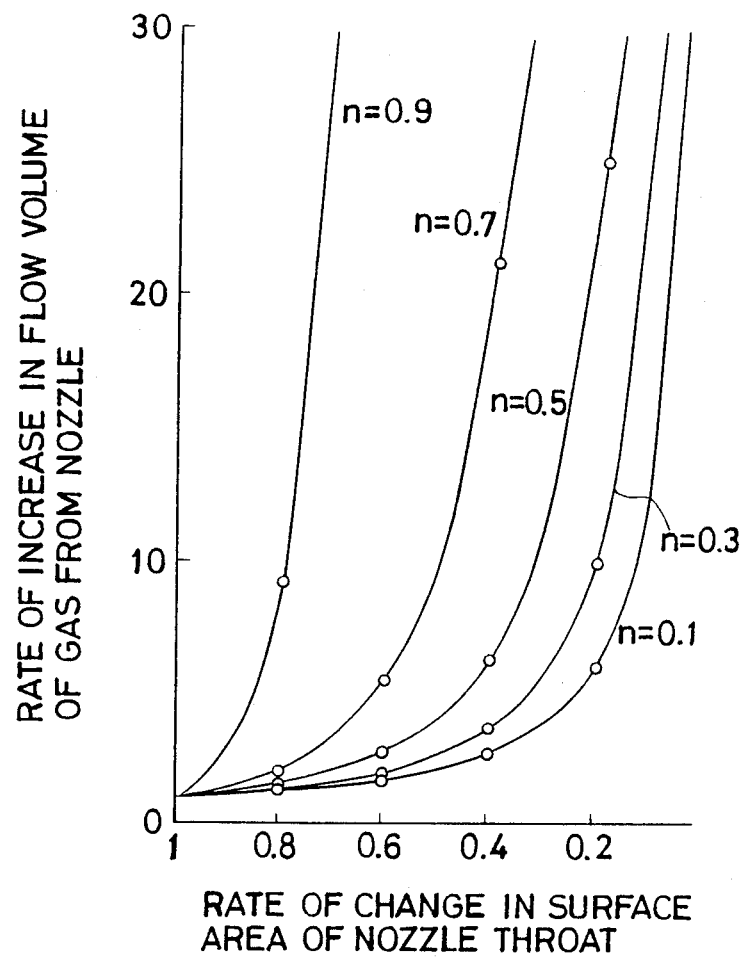

GAS-GENERATING AGENT FOR USE IN DUCTED ROCKET ENGINE

BACKGROUND OF THE INVENTION

1. Field of the Invention

This invention relates to a gas-generating agent particularly a solid gas-generating agent, for use in a ducted rocket engine.

The ducted rocket engine generally burns a gas-generating agent in a primary combustion chamber thereby generating a hot fuel-rich gas, leading this gas into a secondary combustion chamber, and effecting perfect combustion of this gas inside the secondary combustion chamber with the air introduced therein. It is capable of acquiring a greater thrust than the conventional rockets.

2. Prior Art Statement

As the solid gas-generating agent for use in the ducted rocket engine, part of the components of a composite propellant is utilized. It is composed mainly of a binder serving as a fuel and binder, a metallic powder serving as a metallic fuel, and an oxidizing agent. The binders which are usable for the composite propellant include polybutadiene and polyurethane and, as high-energy binders, polyethers possessing an azidomethyl group (Japanese Patent Public Disclosure SHO 62(1987)-265192), for example, the metallic powders which are usable herein include aluminum and boron, for example. The oxidizing agents which are usable herein include ammonium perchlorate, ammonium nitrate, and nitramine, for example.

In order for the ordinary composite propellant to generate a large amount of gas at an elevated temperature, it is essential that the propellant should contain a large amount of an oxidizing agent. When the ordinary composite propellant is used as a solid gas-generating agent in the ducted rocket engine, therefore, the generated gas is substantially wholly burnt in the primary combustion chamber and the gas led into the secondary combustion chamber has only a small amount of fuel component. Thus, the engine is now allowed to fulfill its function fully.

The solid gas-generating agent for use in the ducted rocket engine is required to be so composed as to contain an oxidizing agent component in an amount incapable of inhibiting the combustion of the gas-generating agent and a fuel component in a large amount.

A solid gas-generating agent for use in the ducted rocket engine which abundantly contains, as the metallic fuel, the metallic powders of aluminum, boron, and magnalium, i.e. an alloy of aluminum with magnesium, has been proposed [Japanese Patent Public Disclosure SHO 59(1984)-92992 and Japanese Patent Public Disclosure SHO 61(9186)-127692].

The solid gas-generating agents for use in the ducted rocket engine which specifically disclosed in these Patent Public Disclosures comprise 40 to 50% by weight of metallic fuel, 15 to 20% by weight of hydroxyl-terminating polybutadiene (HTPB) as a combination fuel and binder, and 35 to 40% by weight of ammonium perchlorate as an oxidizing agent.

The conventional solid gas-generating agents for use in the ducted rocket engine which are described above, however, have the problem that they do not easily generate a gas sufficiently rich in the fuel component because they contain 35 to 40% by weight of the oxidizing agent and, as a result, part of the metallic fuel and the binder as a combination fuel and binder are oxidized in the primary combustion chamber. They also have the problem that since the burning rate is low and consequently the amount of gas to be generated is small and, moreover, the pressure exponent is low, it is difficult to control the flow volume of the gas from the primary combustion chamber by varying the surface area of the nozzle throat of the primary combustion chamber.

When the surface area of the nozzle throat is decreased to one half of the initial value, the flow volume of the gas from the nozzle increases only to about 3.2 times the initial value where the pressure exponent is 0.4 and it increases to about 10.1 times the initial value where the pressure exponent is 0.7. How the relation between the rate of change in the surface area of the nozzle throat and the flow volume of the gas from the nozzle is affected by the change in the pressure exponent, n, is diagrammatically illustrated. For practical purposes, the pressure exponent is desired to be approximately in the range of 0.5 to 0.7.

The inventors have made a diligent study, with due consideration paid to the drawbacks of the conventional gas-generating agent for use in the ducted rocket engine, to acquire the knowledge that a specific aliphatic polyether possessing an azidomethyl group in the side chain thereon as shown by the formula to be described herein below burns without containing any oxidizing agent and, therefore, a gas-generating agent containing this polyether is characterized by burning stably and generating a gas containing a fuel component in abundance, and exhibiting a high burning rate and a high pressure exponent. The present invention has been accomplished as the result.

SUMMARY OF THE INVENTION

To be specific, this invention concerns a gas-generating agent for use in the ducted rocket engine, essentially consisting of one member selected from the group consisting of aliphatic polyethers represented by the formula:

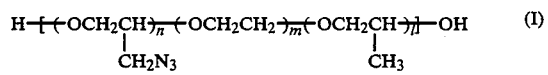

(I)

wherein n is in the range of 10 to 50 and m +1 is in the range of 1 to 10, and the formula:

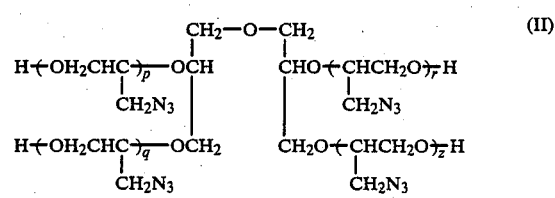

(II)

wherein p, q, r and z are each not less than 1 and p +q +r +z is in the range of 10 to 50, and a curing agent.

The content of the aliphatic polyether is in the range of 81 to 95 wt% and that of the curing agent is in the range of 5 to 19 wt%. Optionally, the gas-generating agent may incorporate therein such additives as a curing catalyst.

The above and other objects and features of the invention will become more apparent from the following detailed description with reference to the accompanying drawing.

BRIEF DESCRIPTION OF THE DRAWING

The drawing is a diagram showing the relation between the rate of change in the surface area of the nozzle throat and the rate of increase in the flow volume of the gas from the nozzle at a varying pressure exponent indicated.

DETAILED DESCRIPTION OF THE PREFERRED EMBODIMENTS

Now, the gas-generating agent of this invention for use in the ducted rocket engine will be described below.

In the polyether represented by the formula (I) to be used in the present invention, if the value of n exceeds 50, the polyether possesses such high viscosity as to impair the facility of manufacture thereof. Conversely, if the value of n is less than 10, the gas-generating agent possesses poor physical properties. Preferably, the value of n is in the range of 20 to 50. If m +1 exceeds 10, the gas-generating agent possesses an unduly low burning rate. Preferably, m +1 is not more than n ×0.2.

In the case of the polyether represented by the formula (II), if p +q +r +z exceeds 50, the polyether possesses such high viscosity as to impair the facility of manufacture thereof and the gas-generating agent containing this polyether exhibits unduly low stress at a 100% elongation. If p +q +r +z is less than 10, the gas-generating agent exhibits inferior physical properties. Preferably, p +q +r +z is in the range of 20 to 50. In the present invention, the content of the polyether in the gas-generating agent is in the range of 81 to 95% by weight. If this content is less than 81% by weight, the burning rate is unduly low. Conversely, if the content exceeds 95% by weight, the gas-generating agent exhibits inferior physical properties.

The gas-generating agent essentially contains the curing agent and optionally incorporates therein a curing catalyst and a cross linking agent. The curing agents which are usable herein include polyfunctional isocyanate compounds such as hexamethylene diisocyanate (HDI), isophorone diisocyanate (IPDI), and tolylene diisocyanate (TDI), for example. Among other curing agents mentioned above, HDI proves to be particularly desirable.

The curing catalyst which are usable herein include organic tin compounds such as dibutyl tin dilaurate (DBTDL) and dibutyl tin (2-ethylhexoate), organic bismuth compounds such as triphenyl bismuth, and amines such as triethylene diamine, for example. Among other curing catalysts mentioned above, DBTDL which exhibits a high catalytic effect and triphenyl bismuth which possesses a long pot life and allows a reduction in the curing time prove to be particularly desirable.

The cross-linking agents which are usable herein include at least trifunctional polyethers such as trimethylol propane (TMP), polyether triol, and polyester triols, for example. Among other cross-linking agents mentioned above, TMP and trifunctional polyols having molecular weights of not more than 3,000 prove to be particularly desirable.

In the gas-generating agent, the content of the curing agent is generally in the range of 5 to 19% by weight, that of the curing catalyst in the range of 0 to 0.01% by weight, and that of the cross-linking agent in the range of 0 to 10% by weight.

The gas-generating agent of this invention, when necessary, may further incorporate therein an oxidizing agent such as ammonium perchlorate (AP), triaminoguanidine nitrate (TAGN), cyclotetramethylene tetranitramine (HMX), or cyclotrimethylene trinitramine (RDX), a nitroplasticizer such as 1,2,4-butane triol trinitrate (BTTN) or trimethylol ethane trinitrate (TMETN), or a combustion auxiliary such as aluminum, magnesium, an alloy thereof, or boron.

The polyethers represented by the formulas (I) and (II) to be used in the present invention are produced as follows, for example.

The polyether of the formula (I) is produced by dissolving a reaction catalyst in a diol selected from the group consisting of ethylene glycol, propylene glycol, α-monochlorohydrin, and polymers thereof, performing in the resultant solution addition reaction of epichlorohydrin to ethylene oxide or to propylene oxide or of epichlorohydrin to ethylene oxide and propylene oxide thereby preparing a hydroxyl-terminating aliphatic polyether possessing a chloromethyl group in the side chain thereof, and then causing the polyether to react with sodium azide in dimethyl formamide (DMF).

The polyether of the formula (II) is produced by dissolving a reaction catalyst in diglycerin, performing in the resultant solution addition reaction of epichlorohydrin to diglycerin thereby preparing a hydroxyl-terminating aliphatic polyether possessing a chloromethyl group in the side chain thereof, and thereafter following the procedure used in the production of the polyether of the formula (I) described above. The polyether consequently obtained is confirmed by elementary analysis, infrared absorption analysis, measurement of molecular weight, and measurement of the number of hydroxyl groups which posses a structure represented by the aforementioned formula.

The gas-generating agent of this invention for use in the ducted rocket engine is manufactured as follows, for example.

It is produced by thoroughly mixing the polyether represented by the aforementioned formula with the curing agent optionally in conjunction with the curing catalyst and further with an oxidizing agent, a plasticizer, and a combustion auxiliary, casting the resultant mixture in a molding container, and heating it for a prescribed time, thereby curing it.

Owing to the use of the specific polyether represented by the aforementioned formula, the gas-generating agent of this invention for use in the ducted rocket engine characteristically exhibits a self-combustion property and generates a gas having a rich fuel component. Further, by possessing a high burning rate and a high pressure exponent, it displays a characteristic quality of facilitating the control of gas-generating rate and also facilitating the control of the thrust of the ducted rocket engine. As concerns the kind of gas-generating agent, the grains of this agent may be freely designed for End burning, Internal burning, or any other type of burning. This gas-generating agent possesses a further characteristic quality of smokelessness when it avoids the incorporation of a combustion auxiliary for the metallic fuel.

Now, the present invention will be described more specifically below with reference to working examples.

EXAMPLE 1

The total of 84.82 parts by weight of an aliphatic polyether represented by the formula (I) (providing n =25, m =1, and l =0), 3.18 parts by weight of trimethylol propane (TMP) as a cross-linking agent, and 0.01 part by weight of dibutyl tin dilaurate (DBTDL) as a curing catalyst was heated to 60° C. and thoroughly kneaded under a vacuum for 30 minutes. The resultant mixture and 11.99 parts by weight of hexamethylene diisocyanate (HDI) added thereto as a curing agent were thoroughly mixed under a vacuum for 10 minutes, to prepare a liquid blend. Then, this liquid blend was cast in a prescribed molding container under a vacuum, deaerated, and then left curing at 60° C. for seven days. Consequently, a gas-generating agent for a ducted rocket engine possessing the composition shown in Table 1 under the appropriate example number was obtained.

The gas-generating agent so obtained was subjected to a burning test and physical property test as follows.

Burning Test

A strand piece was prepared by applying melamine resin to the surface of a bar-like specimen 7 mm ×7 mm ×130 mm of the gas-generating agent. By the use of a Crawford type strand testing device, the strand piece was burnt under a nitrogen gas pressure of 10 to 70 kgf/cm² to determine the burning rate. Then, the pressure exponent was calculated based on the relation between the pressure and the burning rate.

Physical Property Test

A specimen of the gas-generating agent was tested for tensile properties under the following conditions in accordance with Japanese Industrial Standard (JIS) K 6301 (Physical Testing Methods for Vulcanized Rubber).

Test Piece: Dumbbell No. 3.
Stretching rate: 100 mm/min.
Testing temperature: 20° C.

The burning rate, the pressure exponent, the tensile strength, and the elongation determined or calculated as described above are shown in Table 1. The method specified in JIS K 6301 comprises setting a test piece in a chuck of a testing machine, operating the testing machine under the prescribed conditions shown above, taking the reading of the load $F_{100}$ indicated when the length, $L_0$, between the marks on the test piece has doubled (i.e. 100% of elongation), further applying the maximum load, $F_b$, to the test piece, measuring the length, $L_1$, between the marks on the test piece held under the maximum load, and calculating the tensile strength in accordance with the following formula.

$$\sigma_{100} = \frac{F_{100}}{A} \text{ (kgf/cm}^2\text{)}$$

$$\sigma_b = \frac{F_b}{A} \text{ (kgf/cm}^2\text{)}$$

$$\epsilon_b = \frac{L_1 - L_0}{L_0} \times 100 \text{ (\%)}$$

In the formula A stands for the cross-sectional area (cm²) of the test piece.

EXAMPLES 2 TO 10

Gas-generating agents of varying compositions, indicated in Table 1 under the respective headings of Examples 2 to 10, were prepared by following the procedure of Example 1.

The gas-generating agents were subjected to the same burning test and physical property test as in Example 1. The results were as shown in Table 1.

TABLE 1

| Example No. | | 1 | 2 | 3 | 4 | 5 | 6 | 7 | 8 | 9 | 10 |
|---|---|---|---|---|---|---|---|---|---|---|---|
| Gas-generating agent, composition (% by weight) | | | | | | | | | | | |
| Polyether | In formula n | 25 | 25 | 25 | 25 | 50 | 50 | 25 | 25 | 25 | 25 |
| | m | 1 | 1 | 1 | 1 | 10 | 5 | 1 | 1 | 1 | 1 |
| | l | 0 | 0 | 0 | 0 | 0 | 5 | 0 | 0 | 0 | 0 |
| | Content | 84.82 | 90.31 | 94.49 | 84.82 | 81.96 | 81.96 | 81.28 | 81.28 | 81.28 | 81.28 |
| Curing agent | HDI | 11.99 | — | — | 11.99 | 12.65 | 12.65 | — | — | — | — |
| | Polyisocyanate | — | 9.68 | 5.50 | — | — | — | 8.71 | 8.71 | 8.71 | 8.71 |
| Cross-linking agent | TMP | 3.18 | — | — | 3.18 | 5.38 | 5.38 | — | — | — | — |
| Curing catalyst | DBTDL | 0.01 | 0.01 | 0.01 | — | 0.01 | 0.01 | 0.01 | 0.01 | 0.01 | 0.01 |
| | TPB | — | — | — | 0.01 | — | — | — | — | — | — |
| Oxidizing agent | AP | — | — | — | — | — | — | — | 10.0 | — | — |
| | TAGN | — | — | — | — | — | — | — | — | 10.0 | — |
| Nitro-plasticizer | BTTN | — | — | — | — | — | — | 10.0 | — | — | — |
| Combustion auxiliary | Aluminum | — | — | — | — | — | — | — | — | — | 10.0 |
| Test result | | | | | | | | | | | |
| Burning rate (mm/s) (P = 30 kgf/cm²) | | 10.5 | 13.8 | 14.8 | 14.5 | 8.5 | 8.8 | 8.6 | 8.1 | 7.2 | 10.6 |
| Pressure exponent (—) (P = 10~70 kgf/cm²) | | 0.63 | 0.65 | 0.53 | 0.55 | 0.64 | 0.68 | 0.74 | 0.71 | 0.88 | 0.53 |
| $\sigma_{100}$ (kgf/cm²) | | 1.7 | 1.8 | 1.5 | 1.6 | 1.9 | 1.7 | 2.0 | 1.5 | 2.0 | 1.9 |
| $\sigma_b$ (kgf/cm²) | | 3.1 | 3.6 | 3.4 | 3.2 | 3.6 | 3.5 | 3.1 | 2.7 | 3.0 | 2.9 |
| $\epsilon_b$ (%) | | 280 | 242 | 257 | 224 | 285 | 301 | 230 | 220 | 221 | 205 |

(Note) $\sigma_{100}$ stands for stress at 100% elongation,
$\sigma_b$ for tensile strength,
$\epsilon_b$ for elongation.
Polyisocyanate stands for polymethylene polyphenyl polyisocyanate.

COMPARATIVE EXPERIMENT 1

A gas-generating agent of the composition shown in Table 2 was prepared by following the procedure of Example 1, excepting hydroxyl-terminating polybutadiene (HTPB) was used in the place of the polyether.

This gas-generating agent was subjected to the same burning test and physical property test as in Example 1. The results were as shown in Table 2.

COMPARATIVE EXPERIMENTS 2 TO 6

Various gas-generating agents shown in Comparative Experiments 2 to 6 of Table 2 were prepared by following the procedure of Example 1.

These gas-generating agents were subjected to the same burning test and physical property test as in Example 1.

The results were as shown in Table 2.

TABLE 2

| Comparative Experiment No. | | | 1 | 2 | 3 | 4 | 5 | 6 |
| --- | --- | --- | --- | --- | --- | --- | --- | --- |
| Gas-generating agent, composition (% by weight) | | | | | | | | |
| HTPB | | | 88.0 | — | — | — | — | — |
| Polyether | In formula | n | — | 20 | — | 25 | 25 | 8 |
| | | m | — | 2 | 1 | 1 | 1 | 1 |
| | | l | — | 0 | 0 | 0 | 0 | 0 |
| | Content | | — | 16.78 | 81.96 | 75.58 | 96.91 | 82.58 |
| Curing agent | HDI | | 9.83 | 2.39 | 12.65 | 17.80 | — | 16.53 |
| | Polyisocyanate | | — | — | — | — | 3.08 | — |
| Cross-linking agent | TMP | | 2.09 | 0.48 | 5.38 | 6.62 | — | 0.88 |
| Curing catalyst | DBTDL | | 0.01 | 0.01 | 0.01 | 0.01 | 0.01 | 0.01 |
| Binding agent | TEPANOL | | — | 0.34 | — | — | — | — |
| Oxidizing agent | AP | | — | 80.00 | — | — | — | — |
| Test result | | | | | | | | |
| Burning rate (mm/s) (P = 30 kgf/cm$^2$) | | | don't burn | 6.4 | 9.2 | 4.4 | 14.7 | 10.2 |
| Pressure exponent (—) (P = 10~70 kgf/cm$^2$) | | | | 0.40 | 0.68 | 0.40 | 0.58 | 0.65 |
| $\sigma_{100}$ (kgf/cm$^2$) | | | | — | 0.51 | 3.0 | 0.47 | 1.5 |
| $\sigma_b$ (kgf/cm$^2$) | | | | 7.1 | 1.36 | 4.2 | 1.5 | 3.2 |
| $\epsilon_b$ (%) | | | | 30.0 | 450 | 155 | 409 | 131 |

(Note) TEPANOL stands for the reaction of tetraethylene pentamine with acrylonitrile and glycidol (produced by 3M Corp. and marketed under product code of "HX-878").

EXAMPLE 11

A gas-generating agent of a composition shown in Table 3 under the heading of "Example 11" for use in a ducted rocket engine was produced as follows.

The total of 91.71 parts by weight of an aliphatic polyether represented by the formula (II) (providing p +q +r +z =30) and 0.01 part by weight of dibutyl tin dilaurate (DBTDL) as a curing catalyst was thoroughly mixed under a vacuum at 20° C. for 10 minutes.

Then, the resultant mixture and 8.28 parts by weight of hexamethylene diisocyanate (HDI) added thereto as a curing agent were thoroughly kneaded under a vacuum for 30 minutes to obtain a liquid blend. Then, this liquid blend was cast under a vacuum in a prescribed molding container, deaerated, and then left curing at 20° C. for seven days, to obtain a gas-generating agent.

This gas-generating agent was subjected to the same burning test and physical property test as in Example 1. The results were as shown in Table 3.

EXAMPLES 12 TO 16

Gas-generating agents conforming to the present invention were prepared by following the procedure of Example 11, excepting the composition of polyether, curing agent, and curing catalyst was varied. These gas-generating agents were subjected to the same burning test and physical property test as in Example 1. The compositions of the gas-generating agents and the results of tests are shown in Table 3.

EXAMPLES 17 TO 20

Gas-generating agents conforming to this invention were prepared by adding an oxidizing agent, a nitroplasticizer, and a combustion auxiliary besides a polyether and a curing agent. These gas-generating agents were subjected to the same burning test and physical property test as in Example 1. The compositions of the gas-generating agents and the results of tests are shown in Table 3. The amounts of oxidizing agent, nitroplasticizer, and combustion auxiliary were shown in extrapolative ratios, % by weight, based on 100% by weight of the total of polyether and curing agent.

TABLE 3

| Example No. | | 11 | 12 | 13 | 14 | 15 | 16 | 17 | 18 | 19 | 20 |
| --- | --- | --- | --- | --- | --- | --- | --- | --- | --- | --- | --- |
| Gas-generating agent, composition (% by weight) | | | | | | | | | | | |
| Polyether | In formula p + q + r + z | 30 | 30 | 30 | 30 | 50 | 50 | 30 | 30 | 30 | 30 |
| | Content | 91.71 | 89.75 | 90.29 | 91.71 | 93.65 | 91.76 | 91.71 | 91.71 | 91.71 | 91.71 |
| Curing agent | HDI | 8.28 | — | — | 8.28 | 6.34 | — | 8.28 | 8.28 | 8.28 | 8.28 |
| | IPDI | — | 10.24 | 9.70 | — | — | 8.23 | — | — | — | — |
| Curing catalyst | DBTDL | 0.01 | 0.01 | 0.01 | — | 0.01 | — | 0.01 | 0.01 | 0.01 | 0.01 |
| | TPB | — | — | — | 0.01 | — | 0.01 | — | — | — | — |
| Oxidixing agent | AP | — | — | — | — | — | — | (11.0) | — | — | — |
| | TAGN | — | — | — | — | — | — | — | (11.0) | — | — |
| Nitro-plasticizer | BTTN | — | — | — | — | — | — | — | — | (11.0) | — |
| Combustion auxiliary | Aluminum | — | — | — | — | — | — | — | — | — | (11.0) |
| Test results | | | | | | | | | | | |
| Burning rate (mm/s) (p = 30 kgf/cm$^2$) | | 11.3 | 10.2 | 10.8 | 11.5 | 13.2 | 11.6 | 8.3 | 7.5 | 8.5 | 7.1 |
| Pressure exponent (—) (P = 10~70 kgf/cm$^2$) | | 0.69 | 0.61 | 0.63 | 0.71 | 0.71 | 0.68 | 0.73 | 0.81 | 0.68 | 0.61 |
| $\sigma_{100}$ (kgf/cm$^2$) | | 1.9 | 1.9 | 1.6 | 1.7 | 1.2 | 1.5 | 1.7 | 1.4 | 1.2 | 1.5 |
| $\sigma_b$ (kgf/cm$^2$) | | 3.6 | 3.8 | 3.3 | 3.5 | 3.0 | 3.2 | 3.3 | 3.0 | 2.8 | 3.4 |
| $\epsilon_b$ (%) | | 238 | 224 | 241 | 242 | 253 | 239 | 227 | 214 | 239 | 242 |

COMPARATIVE EXPERIMENT 7

A gas-generating agent of the composition shown in Table 4 was prepared by following the procedure of Example 11, excepting hydroxyl-terminating polybutadiene (HTPB) was used in the place of the polyether.

This gas-generating agent was subjected to the same burning test and physical property test as in Example 1. The results of the test were as shown in Table 4.

COMPARATIVE EXPERIMENTS 8 TO 12

Gas-generating agents not conforming to this invention were prepared by following the procedure of Example 11, excepting polyethers possessing structures represented by the formula (II) and p +q +r +z outside the range specified by this invention or containing polyethers in proportions outside the range specified by this invention were used instead. These gas-generating agents were subjected to the same burning test and physical property test as in Example 1. The compositions of the gas-generating agents and the results of tests in these comparative experiments are shown in Table 4.

TABLE 4

| Comparative Experiment No. | | 7 | 8 | 9 | 10 | 11 | 12 |
|---|---|---|---|---|---|---|---|
| Gas-generating agent, Composition (% by weight) | | | | | | | |
| HTPB | | 89.80 | — | — | — | — | — |
| Polyether | In formula p + q + r + z | — | 30 | 20 | 50 | 8 | 60 |
| | Content | — | 18.08 | 80.35 | 96.12 | 85.11 | 94.70 |
| Curing agent | HDI | 10.19 | 1.55 | — | 3.87 | 4.88 | 5.29 |
| | IPDI | — | — | 19.64 | — | — | — |
| Curing catalyst | DBTDL | 0.01 | 0.01 | 0.01 | 0.01 | 0.01 | 0.01 |
| Binding agent | TEPANOL | — | 0.36 | — | — | — | — |
| Oxidizing agent | AP | — | 80.00 | — | — | — | — |
| Test results | | | | | | | |
| Burning rate (mm/s) (P = 30 kgf/cm$^2$) | | don't burn | 7.1 | 7.5 | 14.5 | 9.2 | 13.8 |
| Pressure exponent (—) (P = 10~70 kgf/cm$^2$) | | | 0.40 | 0.58 | 0.71 | 0.62 | 0.67 |
| $\sigma 100$ (kgf/cm$^2$) | | | — | 2.7 | 0.5 | 2.0 | 0.7 |
| $\sigma b$ (kgf/cm$^2$) | | | 9.8 | 4.3 | 1.6 | 3.8 | 2.1 |
| $\epsilon b$ (%) | | | 28.0 | 128 | 403 | 192 | 363 |

Examples 1 to 6 covered gas-generating agents of this invention using aliphatic polyethers represented by the formula (I) described above. It is apparent that these gas-generating agents invariably possessed the self-combustion property as compared with the gas-generating agent of Comparative Experiment 1 which was formed solely of hydroxyl-terminating polybutadiene (HTPB). Comparative Experiment 2 covered a composition used for a composite propellant. Comparison of the gas-generating agents of these examples with those of Comparative Experiments 2 and 4 in terms of combustion performance clearly reveals that the gas-generating agents having polyether contents of more than 81% by weight (working examples of this invention) exhibited characteristic qualities of high burning rate and high pressure exponent.

Further, comparison in terms of physical properties reveals that the gas-generating agent of Comparative Experiment 5 which had a polyether content of more than 95% by weight showed a conspicuously low stress ($\sigma 100$) at a 100% elongation. The gas-generating agent of Comparative Experiment 3 using a polyether having a value of more than 50 for n and the gas-generating agent of Comparative Experiment 6 using a polyether having a value of less than 10 for n showed inferior physical properties as compared with the gas-generating agents of the working examples.

Examples 7 to 10 covered solid gas-generating agents incorporating therein a small amount of oxidizing agent or metallic fuel besides polyether. These gas-generating agents invariably possessed characteristic qualities of high burning rate and high pressure exponent.

The gas-generating agents of the present invention covered by Examples 11 to 20 invariably contained polyethers represented by the formula (II) in amounts in the range of 81 to 95% by weight. They showed burning rates equal or exceeding 7.0 mm/s., pressure exponents equal or exceeding 0.50, $\sigma 100$'s equal or exceeding 1.0, $\sigma b$'s equal or exceeding 2.5, and $\epsilon b$'s equal or exceeding 200.

In contrast thereto, it has been demonstrated that the gas-generating agent of Comparative Experiment 7 containing hydroxyl-terminating polybutadiene (HTPB) as a combination fuel and binder is a proportion of about 90% by weight, the value specified for the polyether in the gas-generating agent of this invention, failed to burn.

Comparative Experiment 8 covered a composition used for a composite propellant, Comparative Experiment 9 covered a gas-generating agent whose polyether content failed to reach the limit of 81% by weight, and Comparative Experiment 10 covered a gas-generating agent whose polyether content exceeded the limit of 95% by weight. Comparative Experiments 11 and 12 covered gas-generating agents using polyethers whose totals of p +q +r +z were less than 10 and more than 50 respectively. The gas-generating agents of the various comparative experiments were found to possess inferior physical properties as compared with those of the working examples, as shown below.

Specifically, the gas-generating agent of Comparative Experiment 8 showed an unduly low pressure exponent, the gas-generating agents of Comparative Experiments 10 and 12 showed unduly low values of $\sigma 100$ and $\sigma b$, and the gas-generating agents of Comparative Experiments 13 and 15 shows the notably low value of $\epsilon b$.

Examples 17 to 20 serve to demonstrate that even when an oxidizing agent, a nitro-plasticizer, a combustion auxiliary, etc. were incorporated in small amounts, the gas-generating agents maintained their proper performance intact so long as the polyester, as a substantial main component, fulfilled the requirement recited in the Claim of Invention.

What is claimed is:

1. A gas-generating agent for use in a ducted rocket engine, essentially consisting of one member selected from the group consisting of aliphatic polyethers represented by the formula:

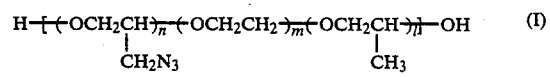

wherein n is in the range of 10 to 50 and m +1 in the range of 1 to 10, and the general formula:

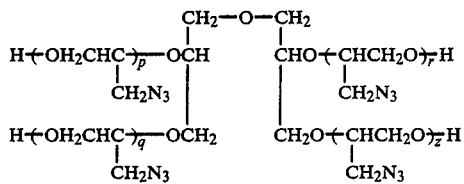

wherein p, q, r, and z are each not less than 1 and p +q +r +z is in the range of 10 to 50, and a curing agent.

2. A gas-generating agent according to claim 1, wherein the content of said aliphatic polyether is in the range of 81 to 95% by weight.

3. A gas-generating agent according to claim 1, wherein the content of said curing agent is in the range of 5 to 19% by weight.

4. A gas-generating agent according to claim 1, wherein said curing agent is at least one polyisocyanate.

5. A gas-generating agent according to claim 4, wherein said polyisocyanate is hexamethylene diisocyanate.

6. A gas-generating agent according to claim 1, which further comprises at most 0.01% by weight of a curing catalyst.

7. A gas-generating agent according to claim 5, wherein said curing catalyst is at least one member selected from the group consisting of dibutyl tin dilaurate and triphenyl bismuth.

* * * * *